United States Patent [19]

Ishiwata

[11] 4,112,760
[45] Sep. 12, 1978

[54] LIQUID LEVEL MEASURING DEVICE

[75] Inventor: Samford P. Ishiwata, New Rochelle, N.Y.

[73] Assignee: Texaco Inc., New York, N.Y.

[21] Appl. No.: 790,642

[22] Filed: Apr. 25, 1977

[51] Int. Cl.² .................................... G01F 23/18
[52] U.S. Cl. .................................................. 73/299
[58] Field of Search ....................... 73/290, 299, 302

[56] References Cited

U.S. PATENT DOCUMENTS

| 1,631,909 | 6/1927 | Badin | 73/302 |
| 2,651,938 | 9/1953 | Heigel | 73/299 |

FOREIGN PATENT DOCUMENTS 375,979  10/1939  Italy ................................. 73/302

Primary Examiner—S. Clement Swisher
Attorney, Agent, or Firm—Thomas H. Whaley; Carl G. Ries; Robert B. Burns

[57] ABSTRACT

A liquid level gauge for tanks and other liquid holding receptacles, having a pressure sensing chamber which is partially enclosed by a flexible diaphragm and which is communicated with a pressurized medium. Pressure control means cooperative with said chamber, is communicated therewith together with a switching means to neutralize the deflection of the diaphragm which is normally caused by liquid in the tank.

6 Claims, 2 Drawing Figures

LIQUID LEVEL MEASURING DEVICE

BACKGROUND OF THE INVENTION

To continuously measure or monitor the liquid or fluid contents of a large receptacle such as a tank, a marine or automotive tanker, the level sensing mechanism should not be adversely affected by the liquid. Further, in the instance of cargo carriers, the liquid carried is not always uniform between trips. A marine tanker for example might in the same tank carry crude products or ballast water on sequential trips.

To assure that the liquid gauging mechanisms or system remains operable under all circumstances, the system should be segregated from the liquid as much as possible. However, to maintain overall accuracy, it must nonetheless be capable of sensing or monitoring even minute changes in liquid level.

In the present arrangement, the liquid level gauging means comprises in brief, a pressure sensing chamber which is normally disposed at or near the floor of a vessel or tank. The pressure sensing chamber is communicated with a source of a pressurizing fluid such as air or preferably an inert gas.

At least one portion of said pressure sensing chamber is provided with a flexible or partially displaceable diaphragm. The diaphragm is of sufficient expanse that it will deflect from a normal neutral position in response to a pressure which is applied to either side of the diaphragm.

The pressurizing medium will in effect serve to neutralize deflection of the diaphragm while the gauge is in operation. A switching means within said pressure sensing chamber is actuated in response to displacement of the diaphragm either inwardly or outwardly. However, the flow of pressurizing medium which is controlled by pressure control means, is so regulated to maintain the diaphragm in its neutral position.

The pressure thereby maintained within the pressure sensing chamber is indicative of the static pressure on the external side of the diaphragm due to liquid in the tank, and consequently is indicative of the height of the contained liquid.

It is therefore an object of the invention to provide an accurate monitoring system for a liquid holding tank. A further object is to provide a liquid level monitoring system, having a wide operating range, and which has minimum exposure to the liquid being measured.

Figure 1:
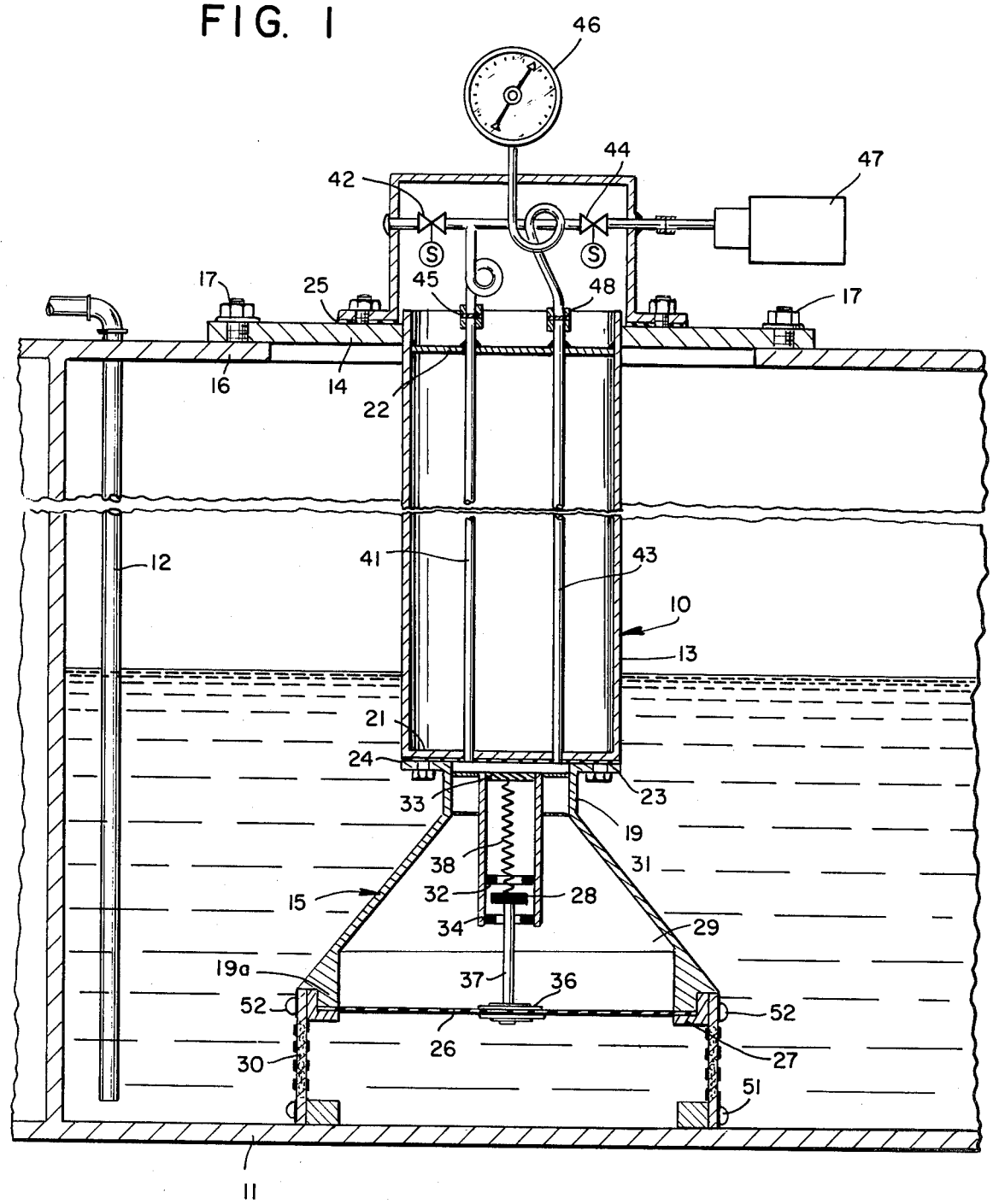
FIG. 1 is a vertical elevation view in cross section of a gauge of the type contemplated positioned in a liquid holding tank.

Referring to the drawings, the instant liquid measuring device 10 is illustrated in conjunction with a relatively deep tank 11 such as the type found on a marine tanker or land based storage vessel. In such a receptacle, the pressure at the tank floor can achieve an order of magnitude of 90 feet. The tank will of course be provided with means for on and offloading the fluid. This is represented by conduit 12 communicating with the tank interior to facilitate an operation. Conduit 12 is a part of the overall tank pumping system, being connected to the necessary pumping and valving means to regulate liquid flow.

The instant liquid level gauging arrangement as shown, can be embodied in a single elongated casing 13 which is fixedly positioned in tank 11 by way of an access port in the tank upper side. The lower end of conduit 12 is disposed adjacent to the tank floor.

Preferably the lower end of the gauge assembly is slightly elevated from the tank floor and is protected by a filter element 13a from the normal build-up of dirt, sludge, or other materials, which ordinarily accumulate during an oil storage period.

Elongated casing 13 is preferably metallic, such as represented by a length of pipe or tubing of sufficient diameter to be readily lifted and handled. One or more support members 14 depend outwardly from the upper end of casing 13, thereby providing means for supporting the assembly through a tank port 16 by a series of bolts 17, studs, or the like. The upper end of casing 13 is provided with a rigid, transverse end wall 22. A cylindrical cover or closure member 20 is bolted to support member 14 in a manner to compress a gasket 25 or other sealing member to render the cover 20 gas tight. Cover 20 also provides a foundation for pressure gauge 46 and houses pressure control valves 42 and 44 as will be hereinafter noted.

The lower end of casing 13 is provided with a rigid end wall 21 and is attached to a sensing head 15 which is effect comprises a cylindrical section 19 having a flange 23 and a conical section 18. The latter is so shaped to diverge outwardly to terminate at a peripheral lip 19a. Sensing head 15 is preferably bolted to the lower end of casing 13 in a manner to compress a gasket 24 or other sealing member to render the entire gauge assembly fluid as well as gas tight.

The peripheral lower lip 19a of sensing head 15 is of sufficient size to accomodate a flexible diaphragm 26 thereacross. Said diaphragm is fastened in place by a bezel ring 27 or a similar means for tightly engaging the diaphragm to the lip in a fluid as well as a gas tight seal. Further, such a connection is readily broken to permit replacement of the diaphragm member 26 which is normally formed of a flexible material, or a composite material which permits it to deflect inwardly or outwardly for a limited distance as will be hereinafter noted. It is further fabricated to be non-reactive to the gas or fluid acting thereagainst.

Diaphragm 26, when in an unloaded condition, is not drawn so tight and assembled as to avoid being flexed in response to a force applied to either side thereof either by an interior pressurizing medium, or by an exterior liquid force. A switching member 28 is carried within the sealed pressure sensing chamber 29 and comprises a downwardly depending support ring 31 of an elecrically non-conducting material. Said ring in turn carries a pair of metallic, circular contact rings 32 and 34. The latter are positioned to define a generally circular passage longitudinally therethrough.

A linkage means connects displaceable diaphragm 26 with the switching means 28 such that there is free, relative sliding action therebetween. Thus, one form of linkage means comprises in essence a base member 36 which is attached to the inner surface of diaphragm 26. An upstanding column or pin 37 is of sufficient length to be supported in a generally vertical disposition with respect to sensing head 15 by means of a tension spring 38. The latter connects the upper end of pin 37 to the end wall 33 of supporting ring 31, and is so adjusted that it maintains diaphragm 26 horizontally flat, when no force is acted thereon. Switching member 28 in the form of a metallic circular disk is fixed to the upper end of pin 37 and comes into contact with one of the individual contact rings 32 and 34 as diaphragm 26 is deflected upwardly or downwardly from its neutral position.

Toward regulating the pressure within sensing head 15 the latter is provided with a plurality of conduits, the purposes of which are to either inject or remove pressurizing medium from pressure sensing chamber 29 and to measure the pressure inside pressure sensing chamber 29 by means of pressure gauge 46.

As here shown, one such conduit 41 includes a pipe or similar member which sealably transverses end walls 21 and 22, respectively and is connected at its upper end to two branch conduits with control valves 42 and 44. Conduit 41 is equipped with a coupling 45 which enables it to be separated from the respective branch conduits and valves when cover 20 is removed. The primary functions of conduit member 41 are to first, controllably vent pressure sensing chamber 29 to the atmosphere through valve 42, or secondly, to inject pressurizing medium into pressure sensing chamber 29 through a valve 44. These functions are achieved by the electrically actuated solenoid valve 42 which is provided with a limited fluid passage or opening. The latter thus permits only limited flow, or a bleed of pressurizing fluid, thereby avoiding a sudden drop in pressure within the sensing head 15 when valve 42 is actuated to the open position and is also electrically actuated to the open position to introduce a controlled flow of the pressurizing medium such as air or inert gas from a compressor 47 or similar gas storage means. Second conduit 43 extends through casing 13, being sealed to walls 21 and 22, respectively. Said conduit 43 is provided with a pressure sensitive indicating gauge or similar pressure measuring device 46. Said valve thus senses fluid pressure within pressure sensing chamber 29 and visually or remotely registers the same.

Conduit 43 is also equipped with a coupling 48 which enables the conduit to be separated from gauge 46 when cover 20 is removed. Diaphragm 26 is protected by filter 30 from contact with heavy dirt, sludge or other materials. Filter 30 is attached to lower lip 29 and bottom ring 51 by fasteners 52, and will allow only fluid to pass, thus preventing an accumulation of undesirable materials under diaphragm 26.

Operationally, with no liquid in the tank 11, displaceable diaphragm 26 will be balanced in a neutral, horizontal position by virtue of the tension spring 38. The latter can be preadjusted to vary its tension, and consequently the initial disposition of said diaphragm 26.

As liquid or fluid is introduced into tank 11 through conduit 12, the liquid level will progressively rise from the tank floor past diaphragm 26.

The rising liquid level will exert a progressively increasing pressure against the lower surface of said diaphragm 26. The latter is thus urged inwardly into pressure sensing chamber 29, moving the linkage pin 37 upwardly from its neutral position. Said movement brings switching member 28 into contact with the upper contact ring 32.

Figure 2:
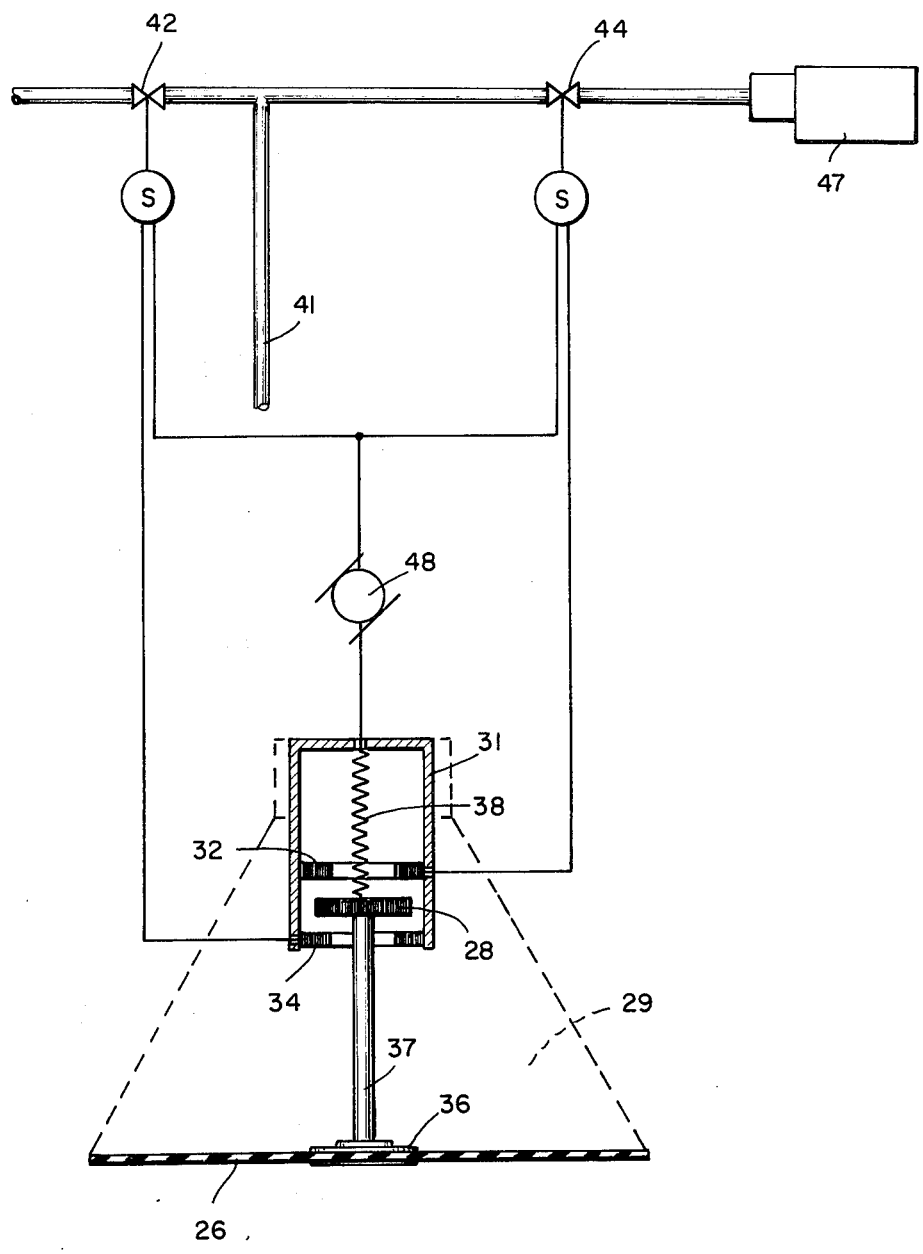
FIG. 2 is a schematic diagram of the control system integrated.

The latter as shown in FIG. 2, is connected through an electrical source 49 to solenoid actuated control valve 44, thereby opening said valve and initiating the flow of gas from compressor 47 or other gas storage means. Said gas flow will continue until pressure within the pressure sensing chamber 29 is built to a point equivalent to the pressure acting on the external surface of diaphragm 26. This status will be achieved when diaphragm has been urged downwardly by internal pressure to its normal, horizontal position, thus breaking the contact between switching member 28 and contact ring 32, and causing valve 44 to close.

With further introduction of liquid into tank 11, diaphragm 26 will again be deflected upwardly into pressure sensing chamber 29. A similar sequence of steps will thereafter occur, terminating in the stabilization of the pressure sensing chamber 29 through the introduction of the pressurizing medium.

In summary, as the liquid level within tank 11 advances toward the top of the tank, the pressure exerted against the undersurface of diaphragm 26 will also progressively increase. To maintain the stable condition of diaphragm 26, the pressure applied to the upper surface of the diaphragm 26 will also be progressively increased. Thus, the visual gauge 46 or other means for measuring the pressure within the sensing head 15, will be directly indicative of the level of the liquid within the tank.

During an unloading period, the reversed sequence will occur, the objective being again to maintain the substantially horizontal disposition of diaphragm 26. Thus, as the level of liquid decreases within tank 11, the pressure on the lower or outer face of diaphragm 26 will be decreased. The result is that the diaphragm will be forced downwardly in response to the higher pressure within the sensing chamber 29.

With this downward movement, switching member 28 will be brought into engagement with the lower contact ring 34. This action will initiate a signal to the solenoid operated bleed valve 42 such that pressure within the sensing head 15 will be decreased as the pressurizing medium is bled from conduit 41 to the atmosphere. As the liquid level progressively decreases, the same sequence of venting steps stabilizes the disposition of diaphragm 26.

While the sensing apparatus is shown as embodied in casing 13, a suitable arrangement is also found by use of the lower sensing head 15 being supported from one of the conduits. Thus, conduit 41 or 43 could as readily support head 15, while concurrently functioning to conduct pressurizing medium.

Other modifications and variations of the invention as hereinbefore set forth can be made without departing from the spirit and scope thereof, and therefore, only such limitations should be imposed as are indicated in the appended claims.

I claim:

1. A liquid level gauge for a liquid holding tank which includes:
   means forming a fluid tight pressure sensing chamber (29),
   a flexible diaphragm member (26) defining a wall to said pressure sensing chamber (29), and being displaceable in response to a pressure imposed against either side thereof,
   a casing (13) supportably engaging said pressure sensitive chamber (29), being adapted to position said chamber (29) in a liquid holding tank,
   pressure control means communicated with said pressure sensing chamber (29) and including:
   a source of pressure (47),
   conduit means (41) having an electrically controlled valve (42) therein, being communicated with said pressure sensing means (47), vent means including at least one electrically actuated fluid control valve (42) communicated with said pressure sensing chamber (29), flow regulating means including a spring biased pin (37) connected to said diaphragm (26) whereby to permit longitudinal movement of said pin (37) corresponding to displacement of said diaphragm (26), electrical contact means (28) depending from said pin (37), being positioned to selectively engage spaced apart electrical elements (32, 34) whereby to separately actuate said respective control valves (42, 44) in response to longitudinal movement of said pin (37).

2. In a liquid level gauge as defined in claim 1, wherein said conduit means (41) and vent means are contained within said casing (13).

3. In a liquid level gauge as defined in claim 1, wherein said spring biased pin (37) is connected at one end thereof to said diaphragm (26), and the other end thereof being connected to a biasing means (38) whereby to maintain the pin in disposition normal to said diaphragm (26).

4. In a liquid level gauge as defined in claim 1, wherein said pressure sensing chamber (29) includes a contact support member positioned normal to said diaphragm (26) and having said spaced apart elements (32, 34) thereon, said pin (37) being operably positioned with respect to said support member, to selectively engage said contacts when said pin is longitudinally adjusted in response to pressure against said diaphragm (26).

5. In a liquid level gauge as defined in claim 4, wherein said pressure sensing chamber (29) includes an upper transverse wall spaced from said diaphragm (26), and said biasing means (38) being connected to said transverse wall.

6. In a liquid level gauge as defined in claim 4, wherein said biasing means (38) includes a tension spring normally disposed in a state of tension to maintain said pin (37) in a vertical relationship to diaphragm (26).

* * * * *